United States Patent [19]

Iguchi et al.

[11] Patent Number: 4,765,036
[45] Date of Patent: Aug. 23, 1988

[54] CLIP FOR PROTECTING COATED SURFACE

[75] Inventors: Tatsuya Iguchi; Kunihiro Fukuhara; Tsutomu Kadomiya; Moritoshi Fukuda, all of Yokohama, Japan

[73] Assignee: Nifco, Inc., Yokohama, Japan

[21] Appl. No.: 1,257

[22] Filed: Jan. 7, 1987

[30] Foreign Application Priority Data

Feb. 12, 1986 [JP] Japan ............................ 61-18620[U]

[51] Int. Cl.⁴ ........................ A44B 21/00; F16B 19/00
[52] U.S. Cl. ........................................ 24/289; 24/297; 411/508
[58] Field of Search ........................ 24/289, 297, 453; 411/508, 510; 174/138 D

[56] References Cited

U.S. PATENT DOCUMENTS

| 2,946,612 | 7/1960 | Ahlgren | 411/510 |
| 3,213,506 | 10/1965 | Fernberg | 24/289 |
| 3,262,168 | 7/1966 | Overhoff | 24/297 |
| 3,448,494 | 6/1969 | Boyenval et al. | 24/289 |
| 4,007,516 | 2/1977 | Coules | 174/138 D |
| 4,176,428 | 12/1979 | Kimura | 24/297 |
| 4,431,355 | 2/1984 | Junemann | 411/508 |
| 4,636,915 | 1/1987 | Perkins et al. | 24/297 |

FOREIGN PATENT DOCUMENTS

| 0191851 | 9/1985 | Japan | 24/289 |
| 888450 | 1/1962 | United Kingdom | 24/297 |

Primary Examiner—Victor N. Sakran
Attorney, Agent, or Firm—Trexler, Bushnell, Giangiorgi & Blackstone, Ltd.

[57] ABSTRACT

There is disclosed a clip structure insertable through an apertured work piece for protecting coated surfaces of the work piece comprising a main clip body including resilient clip means adapted to be snapped through the aperture and a protecting cap having a dome into which the clip means may be inserted and further having lateral window means through which the clip means may at least partially project when in assembled relationship.

5 Claims, 3 Drawing Sheets

CLIP FOR PROTECTING COATED SURFACE

SUMMARY OF THE INVENTION

This invention relates to an improvement in clips which are used for attaching ornaments and/or other parts onto painted or coated surfaces such as a panel of an automobile body.

The clip comprises a main body comprising a plate member on which an ornament, etc. is mounted, a supporting member which projects from the plate member, and clicks which are provided at the tip ends of the plate member at an angle extending toward the plate member, and a protective cap which is to be placed over the main body.

The clicks of the main body are provided with projections at the inner end thereof or on the side of the supporting member so that the projection and the other edges of the clicks form jaw-like portions respectively.

The protective cap is provided with a flange of a relatively large thickness extending outward from the edge of the opening while the peripheral walls of the cap member are bored windows which are necessary to allow at least the lower portions of said clicks to extend outward therethrough. Between the lower end of the windows and said flange define walls vertical to the flange. When the protective cap in this invention structure is placed over said clip main body, the clicks of the main body become exposed from the windows of the protective cap and the plane extending from said projection to the jaw become covered with said vertical wall of the protective cap.

This invention clip is advantageous in that the clicks of the main body do not contact directly the hole which is provided on the main body for attaching parts, the edges of the hole is always protected with the vertical walls of the protecting cap, and yet the clip is secured with the clicks at least the lower portions of which are exposed outside from the protecting cap.

DETAILED DESCRIPTION OF THE INVENTION:

(Background of the Invention)

This invention relates to an improvement of a clip suitable for attaching various parts or ornaments on a coated or finished surface of a main body such as attaching exterior members like a piece of moulding on the automobile body.

Problems often occur in the assembly line at automobile plants related to the process of attaching exterior parts on an automobile body after it is completely coated or painted.

In attaching such an exterior part after the coating process is finished, methods are selectively chosen from among adhesion, welding, rivetting or caulking depending on whether or not the exterior part and the main body are materially adaptable when joined, the mechanical characteristics needed for attachment such as the required strength in fixing, or aethetic requirements such as to what extent appearances may be deteriorated by damages caused by attachment of parts.

The use of clips in attaching such exterior parts on a finished body of a car has become increasingly popular in recent years as clips satisfy all the conditions such as that attaching process should not disturb the decorative coating and anti-corrosion processing applied on the main body prior to the attachment that the attaching work should be simple and yet should secure the attachment, that the mechanical characteristics of the attachment should be high, and that the attachment should allow modification or repair thereafter.

Although the method of attaching exterior parts with such a clip does not disturb the decorative finish on the main body as welding method may do, and is simpler than rivetting, it still is not free of detriments such that the clip, when pushed in, often breaks the coated or painted surface or accelerates wear and tear if used continuously for a long time.

In the prior art, clips are attached onto an exterior part in advance so that when attaching the exterior part onto a surface, clicks of the clip which are generally resilient are engaged with resilience into an opening bored in the main body of a car and are secured therein.

When the clicks of the clip are being resiliently fitted into the opening, however, they often peel the coat from the surface or damage the coat around the hole to consequently expose the underlying metal.

The clicks of the clip should have a strength sufficient to secure such exterior parts on the main body of a car and have a structure which can be closely and snugly attached into the hole on the main body.

These features of the clicks often cause wear and tear around the hole when the part is subjected to vibration.

In order to eliminate such detriments in the prior art, there has been proposed a clip shown in FIG. 11 wherein an inserting portion of the clip 101 made of a hard material is covered with a cap 102 made of a softer material, and the clip 101 covered with the soft cap 102 is inserted into a hole 103a of the main body 103 of a car or the like. As a result, the clip 101 is prevented from directly contacting the coated surface of the main body 103 and yet the exterior part 104 can be secured onto the main body 103 of the automobile.

The method proposed above, however, is detrimental in that the cap 102 covers the inserting portion of the clip 101 fully to prevent complete attachment between the clip 101 and the main body 103 and moreover the clip cannot be firmly engaged stepwise with the edge of the hole 103a. Consequently the worker cannot be sure about the engagement as he does not feel or hear the clicking-in of the part to thereby often cause insecure attachment between the part 104 and the main body 102.

The above method is further detrimental in that when the clip covered with the resilient cap 102 is pressed into a hole 103a, the cap 102 often becomes expanded by the clip 101. As a result, the clip with the expanded cap 102 becomes engaged with the body 103 through the hole 103a to leave considerable repulsive stress in the cap 102 after attachment. The clip 101 consequently is subjected to the stress exerted in the direction to pull it out of the hole and sometimes is actually pulled out of the hole inconveniently.

(Object of this Invention)

This invention relates to an improvement of the conventional clips.

An object of this invention is to prevent damages, wear and tear of the surface which has been processed for corrosion resistance or for decorative purposes which might otherwise be damaged by a clip when an ornament or a part is attached onto the main body of an automobile with the clip.

Another object of this invention is to provide a clip which has a structure to protect the coated surface and yet can secure the attachment of an ornament or other part with the main body.

Still another object of this invention is to provide a clip which will not become loosened from the main body even if it is used under vibration for a long time by interposing a part of a protective cap between the clip and the main body in assembled state so that the clip can be engaged with the main body in a manner to absorb impacts of vibration.

Those objects and other merits of this invention will be consecutively made clear by the description hereinafter.

FIG. 2 is a plan view of the clip main body A and the protective cap B,

Figure 1:
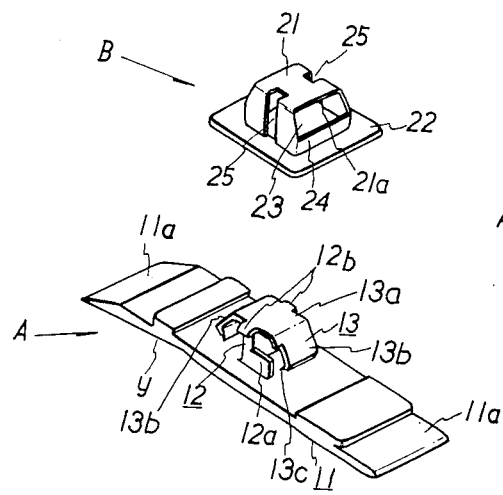
FIG. 1 shows a representative embodiment of the clip according to this invention wherein a clip main body A and a protective cap B are shown separately in a perspective view.
Figure 2:
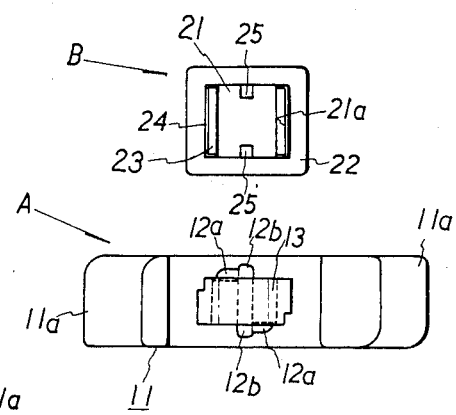
FIGS. 2 through 7 show various illustrations of the clip shown in FIG. 1.
Figure 3:
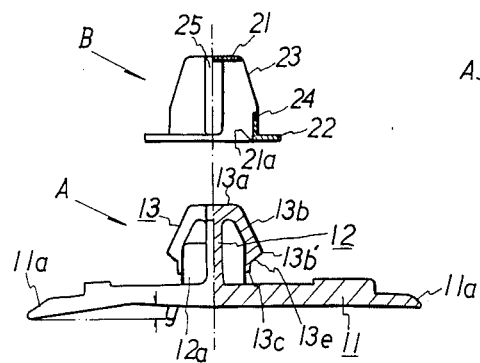

FIG. 3 a frontal view thereof which is partially exploded, and

Figure 4:
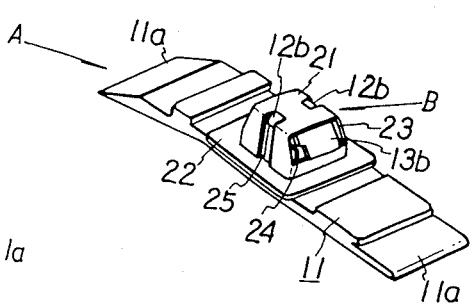

FIG. 4 a perspective view to show the clip main body A covered with the protective cap B.

Figure 5:
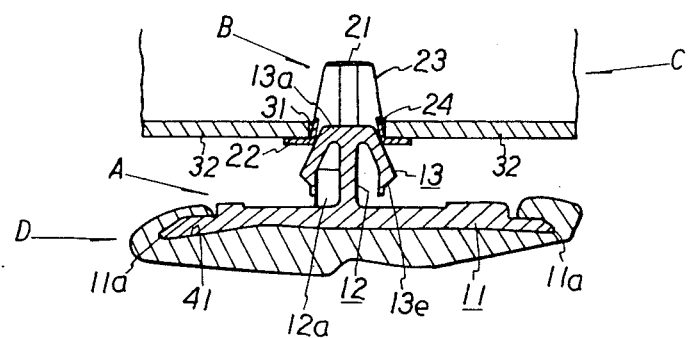
Figure 6:
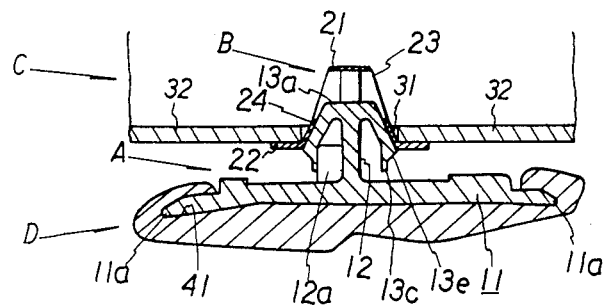
Figure 7:
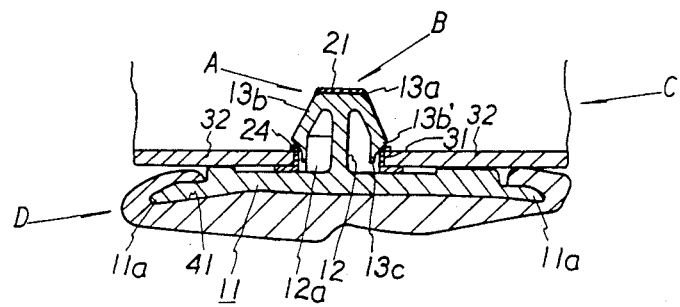

FIGS. 5 through 7 are cross sectional views to show the progressive stages of the process of attaching a clip with an exterior part thereon to the main body C of an automobile.

Figure 8:
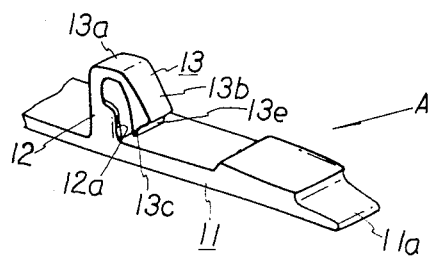
Figure 9:
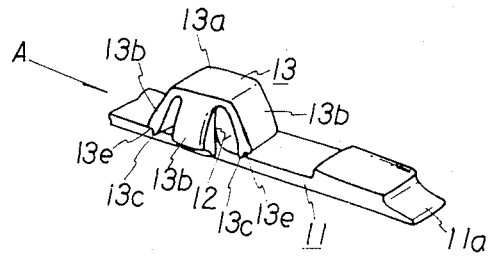

FIGS. 8 and 9 are perspective views of another embodiment of the clip according to this invention wherein only essential parts of the clip main body are shown.

Figure 10:
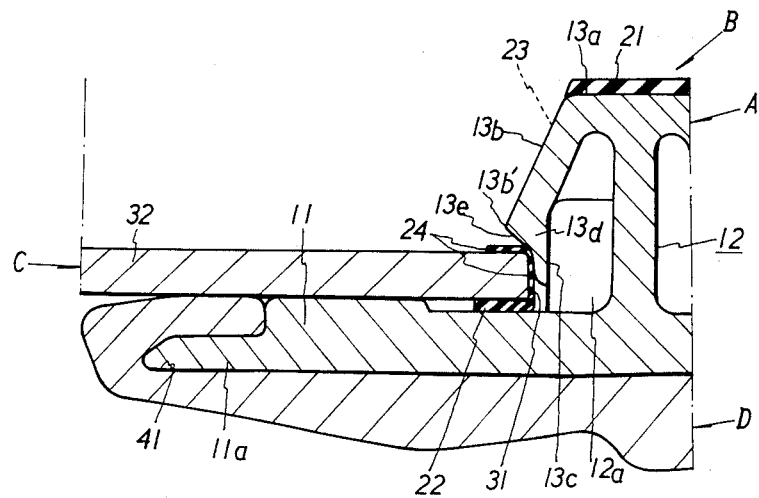

FIG. 10 is an enlarged cross section of a clip which is completely attached on the main body of a car to facilitate understanding of the present invention.

Figure 11:
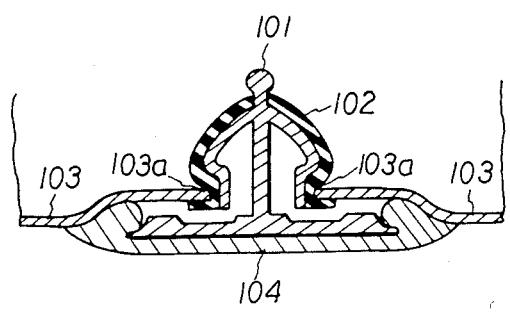

FIG. 11 is a cross section of a prior art improvement made to a clip before this invention.

(Preferred Embodiments)

The clip for protecting coated surfaces according to this invention will now be described referring to preferred embodiments.

The clip for protecting coated surfaces shown in FIGS. 1 through 7 is constructed as described below.

The main body of a clip is denoted by a symbol A. A clip main body A is made of polyacetal or the like which has a relatively high hardness and sufficient impact resilience, and comprises a base plate 11 which can be fit in attaching grooves 41 of an exterior part D such as a moulding part, a supporting member 12 in the form of a plate erected on the base plate 11, and clicks 13 which are provided symmetrically on both sides of the supporting member 12.

A click 13 comprises a top portion 13a which extends horizontally from the top end of the supporting member 12, sloped portions 13b which extend downward at an angle from the ends of the top portion 13a toward the lower side of the supporting member 12 and thick portions 13d at the lower side of the sloped portions 13b. The thick portions 13d respectively have projected edges 13c extending therefrom internally or toward the side of the supporting member 12 to form jaws 13e between the projected edges 13c and the lower outer edges 13b' of the sloped portions.

The projected edges 13c are structured to have a sufficient length so that when the clicks 13 are pushed inside. There will be a sufficient space from the base plate 11.

The supporting member 12 may be in the form of a plate or a rod. When it is in the form of a plate, in particular, reinforcing walls 12a, 12a are erected on said base plate 11 to oppose each other on both sides of the supporting member so as to prevent the member 12 from deflecting. Projections 12b, 12b are provided for guiding the protective cap B on both sides of the supporting member 12.

The base plate 11 is structured in such a manner as to be inserted into the grooves 41 of an exterior part D such as a moulding. The base plate is prepared in various shapes suitable to be fit with exterior parts of various shapes, materials and properties, and structured to have side portions of a less thickness 11a, 11a and warped portions on the surfaces to accommodate with the exterior part D, the recess being equivalent to the length y.

The protective cap B is made of a material such as polyester elastomer which is relatively soft, highly elastic and corrosion resistant. The protective cap 21 is formed as a dome having the dimension sufficient to cap over the supporting member 12 and the clicks 13 of the main body A. The protective cap 21 is provided with a flange 22 of a relatively large thickness extending outward from the opening edges 21a, is bored with windows 23, 23 on opposing walls from the top portion toward the flange 22 so that the sloped portions 13b of the clicks 13 may be exposed outside therethrough when capped. The portions between the lower edges of the windows and the flange 22 form walls 24 vertical to the flange 22.

The opposing peripheral walls on the sides having no windows are provided with slits 25, 25 extending from the top to the flange 22. The projections 12b, 12b are to be engaged within the slits or grooves 25, 25 when the clip main body A is covered with the cap B.

The main body C of an automobile or the like is provided with a hole 31 in which the clicks 13, 13 of the clip main body A are forced into in such a manner as to press the clicks 13, 13 inward. The base plate 11 of the main body A comes to contact with the surface surrounding the hole 31, and the jaw 13e of a click 13 comes to stop at the edge of the hole 31.

The second embodiment of this invention clip will now be described. As is obvious from FIG. 8, the second embodiment is illustrated only for the clip main body A. The protecting cap B may be arbitrarily chosen so far as it accommodates to the shape of the clip main body A. The second embodiment is characterized in that the main body A is provided with only one click 13 at only one side of the supporting member 12. The embodiment is particularly advantageous when the depth of the hole 31 of the body C is limited.

The third embodiment of this invention will now be described. As is seen from FIG. 9, the main body of the clip A is provided with four independent clicks 13 in the four directions in respect of the supporting member 12. The clicks are paired in a manner that two of which are symmetrical in respect of the supporting member 12 while the other two are symmetrical in respect of the member 12. The clip main body A is more secured with the body C with a resistance sufficient to counteract against any force exerted from outside on the exterior part D.

(Operational Effects)

As is clear from the above descriptions, this invention clip for protecting coated surfaces is advantageous in the following points.

In attaching an exterior part D with the clip, the base plate 11 of the clip main body A is inserted into the grooves 41 of the part D. Due to the warped shape by the length y of the base plate 11, the clip main body A can be attached with the part D resiliently. The protective cap B is then placed lightly over the main body A as shown in FIG. 5, and the assembled body and cap are forced into the hole 31 of the main body C.

In forcing the body with cap into the hole, the edge of the hole is covered with the vertical walls 24 and the flange of the cap B so that when the clip main body A is further pressed into the hole, as shown in FIG. 6, the slope portions 13b of the clicks 13 slide over the edge of the hole 31 to be pushed inside and finally to make the jaws 13e of the clicks positioned deeper than the inner edge.

When the jaws 13e enter inside of the inner edge of the hole 31 of the body C, the clicks 13 are released from the pressure applied when it goes through the hole edge and are extended outward so that projections 13c which are positioned inside the jaws 13e come to abut against the hole edge.

All through the pressing-in process of the clip main body A, the hole edge of the hole 31 is constantly protected by the flange 22 and the vertical walls 24 of the cap B. This protection continues even after the clip main body A has sufficiently been pressed in.

In pressing the main body into the hole, the protective cap B is engaged with the main body A by engaging the projections 12b, 12b of the body A within the slits or grooves 25, 25 thereof, the cap B is accurately and smoothly inserted into the hole 31 of the body C together with the clip main body A without being twisted horizontally. As a result, the edge of the hole 31 of the body C is held securely between the vertical walls 24 and the flange 22 of the cap B while the clip main body A is being pressed into the hole 31 of the body C. This can effectively prevent the main body A of the clip from directly contacting the edge of the hole 31 of the body C.

The attachment of the clip for protecting coated surfaces according to this invention may be achieved by inserting the protective cap B into the hole 31 of the main body C in advance and further pressing the clip main body A while the edge of the hole 31 of the body C being protected with the vertical walls 24 and the flange 22 of the protective cap B.

As is obvious from the above description, when sufficiently pressed into the hole 31 of the main body C, the clip main body A is released from the pressure exerted by the edge on the clicks 13 to extend the clicks 13 outward so that the clicks 13 are exposed outside through the windows on the cap B. This can secure extension of the clicks 13 which might otherwise be disturbed by the protective cap B. The clicks can fully extend outward with the projections 13c on the lower edges thereof abutted against the edge of the hole 31.

As a result, the jaws 13e of the clicks 13 become the plates completely abutted against the inner edge of the hole 31. As the protective cap B is provided with windows 23 in this invention clip and as the edge of the hole 31 on the main body C is protected with the vertical walls 24 at the lower ends of the windows 23, the impact resilience can be efficiently prevented from acting on the vertical walls 24 in the direction the clip A is pulled out after it is assembled. (Since the windows section the peripheral walls of the cap B.)

The vertical walls 24 preferably have a width sufficient to cover the areas extending from the jaws 13e of the clicks 13 to the base plate 11 of the main body A of the clip, and are preferably made thin so as to enhance the engagement force with clicks 13.

This invention clip for protecting coated surfaces is adapted to protect the edge of a hole 31 of the body C with the vertical walls 24 and the flange 22 of the protecting cap B, thereby preventing damages on the coat which might otherwise be caused by the clip main body A. Consequently, corrosion and rust arising out of such damages can be effectively prevented. This invention clip can prevent looseness in engagement at attachment. The attachment of exterior parts D is simple and effective, and attached parts can be easily repaired if necessary. When making such repairment, the outer surface is prevented from becoming damaged or soiled.

This invention clip having aforementioned advantageous features is most appropriate as the means for attaching moulding parts on an automobile which are subjected to severe conditions and should be maximally protected from corrosion.

What we claim is:

1. A clip structure insertable through an aperture in a work piece body and for protecting coated surfaces of said work piece body comprising a main clip body including an axially extending support member insertable through said aperture integral at one end with a base plate for overlying one side of the work piece body and resilient clip means integrally extending from a top end of the support member toward the base plate, said chip means including jaw portion adjacent a free end thereof for cooperating with a margin of the work piece body to resist withdrawal of said support from said aperture, and a protecting cap body comprising a dome having an opening at one end and a flange extending outward at an edge of said opening of the cap body, window means extending through lateral peripheral walls of the cap body axially outwardly of said flange so that at least a lower portion of said clip means may project laterally into said window means and be exposed there through, and wall means extending between a lower edge of said window means and said flange, said clip structure being characterized in that said main clip body is assembled with said protective cap by sliding the clip means of the main clip body along an inner surface of said last mentioned wall means of the protecting cap to shield the clip means with said last mentioned wall means from direct engagement with said work piece body.

2. A clip structure for protecting a coated surface of a work piece body as defined in claim 1, wherein said clip means includes a projection extending axially from said jaw portion for extending along said inner surface of said last mentioned wall means of the cap body.

3. A clip structure, as defined in claim 2, wherein said clip means comprises a single resilient element.

4. A clip structure, as defined in claim 2, wherein said clip means comprises a pair of oppositely disposed resilient elements.

5. A clip structure, as defined in claim 1, wherein said support member of said main clip body and said dome of said cap body include cooperable guide means for guiding the protecting cap body onto the main clip body during assembly of said bodies with each other.

* * * * *